Sept. 7, 1926.
R. E. SMITH
METHOD OF AUTOMOBILE IDENTIFICATION
Filed August 8, 1925
1,599,189
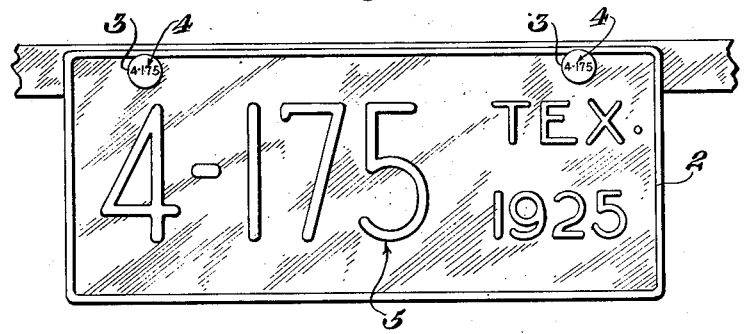
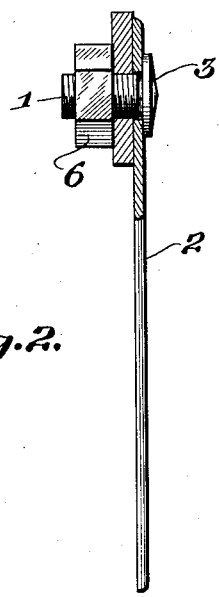
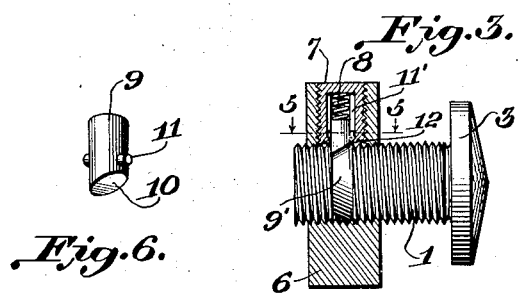
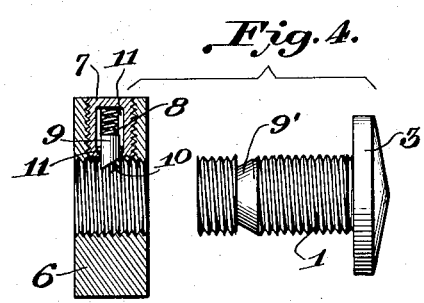
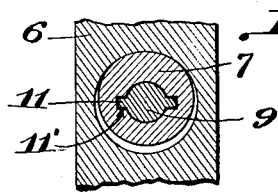
Inventor
Raymond E. Smith.
By William E. Linton.
Attorney Patented Sept. 7, 1926.

1,599,189

UNITED STATES PATENT OFFICE.

RAYMOND ENOCH SMITH, OF SHERMAN, TEXAS, ASSIGNOR OF ONE-HALF TO DAN BROWN, OF SHERMAN, TEXAS.

METHOD OF AUTOMOBILE IDENTIFICATION.

Application filed August 8, 1925. Serial No. 49,006.

This invention relates to improvements in methods of protection for license tags issued by the various State governments and used in connection with motor driven vehicles, whereby such tags, when once attached to a vehicle for which they were originally issued, will be prevented from being removed therefrom and fraudulently placed upon other vehicles without detection.

It is likewise an equally important object of the invention to provide a novel form of device for securing license tags to motor driven vehicles in a manner which will render its removal from a vehicle subsequently to installation or equipment of the same therewith impractical, such device having means for securely locking the clamping nut onto the screw threaded shank of the device whereby to prevent its removal without visible evidence and detection thereof.

It is furthermore an object of the invention to provide a device for securing the license tag to a vehicle having the heads thereof formed sufficiently large to allow of the presentation of matter thereon corresponding to that upon the tag in connection with which it was originally issued, hence, preventing of successful removal thereof from the tag for usage upon another.

Other objects of the invention will be in part obvious, and in part pointed out hereinafter.

In order that the invention and its mode of use may be readily understood by persons skilled in the art, I have in the accompanying illustrative drawing, and in the detailed following description based thereupon, set out one embodiment of the same.

In these drawings:—

Figure 1 is a top elevation of a license tag equipped with the invention;

Figure 2 is an enlarged vertical transverse section through the same;

Figure 3 is a detail, partly in section, showing the manner in which the locking nut is secured to the screw threaded shank of the device;

Figure 4 is a dissembled view, partly in section, showing the clamping bolt of the device and the clamping or locking nut therefor;

Figure 5 is a fragmentary transverse section through the locking nut, taken on the line 5—5 of Figure 3, looking in the direction in which the arrows point; and, Figure 6 is a detail in perspective of the locking pawl employed in connection with the locking or clamping nut.

Having more particular reference to the drawings, in connection with which like characters of reference will designate corresponding parts throughout, the invention may be stated to reside in the method of issuing and equipment of automobile license tags with means for permanently attaching the same to that vehicle for which they were originally issued, such means being of a construction whereby to prevent their fraudulent removal from the originally supplied vehicle and replacement upon another unauthorized vehicle, without detection. To this end, the invention may be stated to comprise a bolt indicated herein by the numeral 1, of which a number may be employed for securing the usual motor driven license tag 2 to a vehicle, although, in this particular embodiment, it will be noted that but two of such bolts or devices are illustrated. These bolts, as indicated herein by the numeral 1, are provided with enlarged heads, shown to be of circular configuration herein, indicated by the numeral 3, having numbers 4 stamped or otherwise permanently presented upon the outer face thereof, as is clearly shown in the Figure 1, said numbers 4 corresponding to the numbers 5 upon the tag 2 in connection with which the bolts or devices 1 were originally issued. Thus, it will be understood that because of the corresponding numbers appearing upon the tag 2 and the outer faces of the enlarged heads 3 of the bolts 1, substitution of said bolts upon license tags bearing other numbers or issued by other State governments will be prevented.

In order that the devices or bolts 1 may be permanently secured to a motor driven vehicle and that the same will be prevented from being removed therefrom without visible mutilation and subsequent detection, each of such bolts are provided with locking or clamping nuts designated by the numeral 6, having transversely disposed internally screw threaded openings in one side thereof communicating with the screw threaded bolt receiving openings therein. A shell or pawl holder 7 comprising a sleeve, circular in cross section and externally screw threaded, is adapted to be snugly engaged and turned into engagement with the internal screw threads of the opening in the nut 6 and to be positioned with respect to said nut, as is shown in the Figures 3 and 4, whereat the inner end of the holder will be directed adjacent the internal screw threaded bolt receiving opening of said nut, while the outer end of the same will be flushly arranged with the corresponding side of the nut. An expansible coiled spring 8 is received within the shell like holder 7 and has one end thereof bearing upon the outer wall of said holder, while the opposite end thereof has bearing upon a lock pawl 9 formed with a bit or bevelled inner end 10, said pawl being also provided with a diametrically disposed guide pin 11, the extremities of which are adapted to be slidably received in diametrically arranged longitudinally disposed guide grooves 11′ formed within the opposite sides of the inner face of the shell like holder 7 aforesaid. To prevent longitudinal displacement of the pawl 9 with respect to its holder 7, the open inner end of such shell like holder is preferably constricted, as indicated by the numeral 12, the size of the opening being such as to prevent passage of the exposed or extended portion of the diametrically positioned pin 11 therethrough. Thus, it will be understood that inward sliding movement of the locking pawl 9 with respect to the nut 6, as well as the holder 7 will be positively limited.

In order that locking connection as between the nut 6 and the screw threaded shank of the bolt 1 may be established at a predetermined period with turning of the nut 6 onto the latter, such screw threaded shank of the bolt is formed with a circumferentially extending way or channel 9′, one side of the channel being bevelled, as is clearly shown in the Figure 4, corresponding to the bevelling of the bit portion of the locking pawl 9, while the opposite or outer side of said channel is of substantially right angular or more acute angular formation in order that the corresponding extremity or portion of the pawl 9 in engaging therewith, as with reverse rotation of the nut 6 upon the bolt 1, will be prevented from riding or passing thereover, as is the case when the bevel portion 10 of the pawl 9 engages with the bevel side or portion of the channel 9′ during inward turning movement of the nut 6 onto the bolt 1, during which movement, the pawl 9 will be permitted to ride over the bevel portion inwardly of the holder 7 against the tension of the expansible coiled spring 8. Hence, it will be understood that while inward turning movement of the nut 6 onto the screw threaded shank portion of the bolt 1 will be permitted, reverse rotary movement of said nut 6 in a manner such as to effect its complete removal from the screw threaded shank, subsequently to engagement of the bit portion of the locking pawl 9 in the circumferentially disposed channel 9′ will be prevented.

The mode of use of the invention may be stated to be as follows:—

The license tag securing devices are assembled by turning the pawl carrying holders 7 into engagement with the internally screw threaded openings formed transversely of the locking nuts 6, whereat the outer end of such holders will lie flushly with the corresponding sides of their equipped nuts. In this position, the coiled spring 8 bearing upon the locking pawl 9 within the holder 7 will normally retain such pawl in a yieldably extended position, as is clearly shown in the Figure 4. When, however, the equipped nut 6 is engaged with the free end of the screw threaded shank portion of the bolt 1 and turned thereonto, said locking pawl 9 will be forced outwardly against the tension of the coiled spring 8 to an inoperative position, hence, permitting free turning of such nut 6 onto the bolt 1. When, however, the nut 6 has been turned onto the bolt 1 for a distance sufficient to align the bit portion 10 of the pawl 9 with the circumferentially disposed channel or way 9′, the spring 8 will then exert an inward thrust to the pawl 9, sufficient to return the same to its normally extended position, as shown in the Figure 3, the bit portion of the pawl thus entering the channel 9′ and by reason of its bevelled formation, will prevent the nut from being reversely rotated in a direction to remove the same from the bolt 1. In this connection, however, it will be noted that the nut 6 may be freely turned inwardly onto the bolt 1 inasmuch as the disposition of the bevelling upon the bit portion 10 of the locking pawl 9 is such as will allow the same to freely ride over the inclined or bevelled portion of the channel 9′ onto the adjacent screw threads. However, as stated above, reverse rotation of the nut 6 being caused, the bevel bit portion 10 of the locking pawl 9 will reenter the circumferentially disposed channel 9′ upon the shank portion of the bolt 1 and because of the right angular formation of the outer wall of said channel, together with the corresponding formation of the adjacent portion of the locking pawl 9, said pawl will serve as a positive and effectual means for preventing continued reverse rotation to such an extent as to permit of the removal of the nut 6 from the bolt. In this connection, it is to be noted that by reason of the slidable engagement of the opposite extremities of the diametrically disposed guide pin 11 in the longitudinally disposed guide grooves 11' within the shell 7, rotation of said locking pawl 9 within the shell or holder 7 will be prevented and consequent thereupon, the bevelled bit portion 10 of such locking pawl will be at all times positioned as is shown in the Figures 3 and 4, whereby the same will be permitted to ride over the bevelled portion of the circumferentially disposed channel 9' with inward movement of the nut 6 over the bolt 1, but with reverse rotation of the nut in a manner to move the same outwardly upon the bolt 1, will engage with the right angularly formed outer wall portion of said channel 9' and prevent of removal of the nut 6 from such bolt without visibly mutilating the same to such an extent as to render subsequent detection thereof possible.

From the foregoing, it will be understood that I have provided a novel and practical method for attaching or securing the license tags of motor driven vehicles to those vehicles for which they were originally issued in a manner to positively prevent of removal of the tags from such original vehicle without visibly mutilating or damaging the same to such an extent as to render subsequent detection thereof readily possible. By permanently presenting the matter 4 upon the outer face of the bolt head 3, such matter corresponding to the matter presented upon the tag in connection with which the bolt was originally issued, it will be understood that removal of the bolt from the original tag for substitution upon other tags, in a fraudulent manner, without detection will be prevented, since in such event, the matter upon the substituted tag would not correspond with the matter upon the bolt heads and thereby, could be readily detected. Furthermore, as stated hereinbefore, because of the novel manner in which the locking or clamping nuts 6 are permanently connected to the screw threaded shanks of the bolts 1, it will be appreciated that when tags equipped with these devices are once secured to a motor driven vehicle, their removal from such vehicle without doing visible damage to either the tag or the securing devices will be positively prevented. Thus, the theft of motor driven vehicle license tags from equipped vehicles and their successful replacement upon other vehicles will be prevented, and likewise, the fraudulent practice of placing and replacing motor driven vehicle license tags upon a number of motor driven vehicles will be prevented.

Manifestly, the construction shown is capable of considerable modification, and such modification as is within the scope of my claims, I consider within the spirit of my invention.

I claim:

1. A device of the character described comprising in combination with an object to be attached to a receiving object, bolts passing through said first object and through adjacent portions of the receiving objects, said bolts having matter presented upon the outer faces of the heads thereof corresponding to matter presented upon the first object, nuts engaged with the screw threaded shanks of said bolts, the screw threaded shanks of such bolts having circumferentially extended channels formed therein, the inner sides of which are bevelled and the outer sides of which are right angularly formed, and spring pressed transversely disposed locking pawls slidably and non-rotatably mounted in openings in said nuts adapted to be engaged in said channels.

2. A device of the character described comprising in combination with an object to be attached and a receiving object therefor, bolts passing through said first object and through adjacent portions of the receiving object, the shank portions of each of said bolts having circumferentially extended channels formed therein, certain of the sides of which are bevelled and the opposite sides of which are of right angular formation, nuts engageable with each of said screw threaded shanks, spring pressed transversely slidable pawls mounted in each of said nuts, means on the pawls engageable with adjacent portions of their respective nuts for preventing rotation of the same with respect to said nuts, the inner end of each of said pawls being bevelled corresponding to the bevelling of said walls of the channels and adapted, at times, to have binding engagement upon the right angularly formed walls of said channels.

3. A device of the character described comprising in combination with an object to be attached and a receiving object therefor, bolts passing through said first object and through adjacent portions of the receiving object, each of said bolts having a circumferentially extended channel formed thereabout, one side wall of which is bevelled and the opposite side wall thereof being of right angular formation, a nut adapted to be engaged by the screw threaded shank of each of said bolts, said nut having a transverse opening formed therein communicating with the screw threaded shank receiving opening of the same, a shell-like holder adapted to be turned into engagement with said first mentioned internally screw threaded opening in the nut and to have the outer end thereof flushly arranged with the corresponding side of said nut, the inner side walls of said holder having diametrically opposed longitudinally extending guide receiving grooves formed therein, a pawl slidably received within said holder, a pin passed diametrically through said pawl having its opposite ends engaged in said longitudinally disposed grooves, the inner end of said pawl being bevelled to correspond to the bevelling of said side wall of the circumferentially disposed channel and one portion of the pawl being adapted to have binding engagement, at times, with the right angularly formed wall of such channel, and the inner open end of the shell being constricted to such an extent as to prevent the passage of the extended end of the diametrically disposed pin therethrough.

In witness whereof, I have hereunto set my hand.

RAYMOND ENOCH SMITH.